United States Patent
Tanji et al.

(10) Patent No.: US 6,512,617 B1
(45) Date of Patent: Jan. 28, 2003

(54) METHODS AND SYSTEMS FOR CONTROL AND CALIBRATION OF VCSEL-BASED OPTICAL TRANSCEIVERS

(75) Inventors: Todd M. Tanji, Egan, MN (US); John J. Stronczer, Mattawan, MI (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 09/243,583

(22) Filed: Feb. 3, 1999

Related U.S. Application Data

(60) Provisional application No. 60/073,481, filed on Feb. 3, 1998.

(51) Int. Cl.[7] .............................................. H04B 10/00
(52) U.S. Cl. ..................................................... 359/152
(58) Field of Search ................................. 359/152, 121; 455/343

(56) References Cited

U.S. PATENT DOCUMENTS

| | | | | |
|---|---|---|---|---|
| 4,687,957 A | * | 8/1987 | O'Neil, II | 250/552 |
| 4,965,444 A | * | 10/1990 | Howe | 250/205 |
| 5,237,441 A | * | 8/1993 | Nhu | 327/72 |
| 5,526,160 A | * | 6/1996 | Watanabe et al. | 359/163 |
| 5,677,779 A | * | 10/1997 | Oda et al. | 359/152 |
| 5,914,976 A | * | 6/1999 | Jayaraman et al. | 359/152 |
| 6,104,512 A | * | 8/2000 | Batey et al. | 340/7.54 |
| 6,160,647 A | * | 12/2000 | Gilliland et al. | 359/110 |

* cited by examiner

Primary Examiner—Jason Chan
Assistant Examiner—David C Payne
(74) Attorney, Agent, or Firm—Gray Cary Ware & Freidenrich

(57) ABSTRACT

An optical transceiver system includes circuitry including a light-emitting device, a driver for the light-emitting device being coupled to the light-emitting device for providing activating power to said light-emitting device and an optical detector disposed to receive light emitted from the light-emitting device, said circuitry being substantially constructed using CMOS technology. A calibration interface is coupled to the circuitry for automatically executing an iterative cycle for a calibration of optical link parameters. And, an optical loop-back is included for optically coupling the light-emitting device and the optical detector, the optical detector receiving light emitted by the light-emitting device, the light emission being selectively stimulated by the calibration interface, the received light emission being communicated to the calibration interface for comparison with a known light signal. A method of automatic calibration and control of optical link parameters in a VCSEL-based optical transceiver is included.

5 Claims, 4 Drawing Sheets

METHODS AND SYSTEMS FOR CONTROL AND CALIBRATION OF VCSEL-BASED OPTICAL TRANSCEIVERS

CROSS-REFERENCE TO RELATED APPLICATION

This application claims priority under 35 U.S.C. § 119 to U.S. Provisional Patent Application No. 60/073,481, filed Feb. 3, 1998, which is incorporated herein by reference.

BACKGROUND OF THE INVENTION

1. Field of the Invention

This invention relates to fiber optic communication, and more particularly, to a method and system for the calibration and control of primary optical link parameters for use within fiber optic communication systems, as well as in other applications.

2. Description of Related Art

Optical transmission systems have three general components: the light source, the transmission medium, and the detector. The light source for an optical transmission system typically includes one or more Light Emitting Diodes (LEDs) or lasers. A pulse of light from the light source commonly indicates a one bit and the absence of light indicates a zero bit. As a light source, the semiconductor laser has distinct advantages over the LED, including higher data rates and longer distance transmission capabilities. The transmission medium is commonly ultra-thin glass fiber. The detector generates an electrical pulse when light falls upon it. With current technology, transceiver modules containing both the light source and the light detector are increasingly preferred.

Low-cost, high-performance, highly integrated fiber optic interface circuits are becoming increasingly necessary to meet the demands of high-speed digital data communication. With the advent of gigabit Ethernet systems, for example, fiber optic technology has become increasingly preferred. A fiber optic transmission line typically uses one or more newly developed and relatively inexpensive vertical-cavity surface-emitting laser (VCSEL) diodes as the light source to transmit optical data.

The high-speed nature of fiber optic communication necessitates that the VCSEL-based optical transceivers operate quickly, accurately and efficiently, for best results.

Calibration of prior art VCSELs is performed manually. An operator typically manually modifies resistance or other parameters while watching the laser output wave form on an oscilloscope or other device. This modification is typically performed by laser trimming or by the use of potentiometers. This method of iterative active manual calibration must typically be performed before assembly of any module containing the laser, which adds undesirable time and expense to the calibration process and the optical transmission systems. Further, recalibrating the transceiver to new or different optical link parameters requires disassembly of the transceiver module, followed by another round of iterative active manual calibration and then reassembly. This adds considerable time and expense to the calibration process.

To enhance the operation of the one or more VCSEL diodes, and to make more efficient and cost-effective the methods and systems for calibrating VCSELs that are compatible with the modularity of present laser transceiver systems, new methods and systems for calibrating VCSEL-based transceivers are needed. Particularly, methods and systems are needed for intelligent, active and automatic calibration and control of primary optical link parameters.

SUMMARY OF THE INVENTION

Accordingly, methods and systems for control and calibration of VCSEL-based optical transceivers are provided that meet many, if not all, of the above-described needs. A control scheme for a VCSEL-diode-based optical transceiver preferably replaces present control methods of manual calibration. The new control scheme preferably utilizes an automated system incorporating an optical feedback loop. Further, the control scheme preferably reduces cost and improves optical transceiver performance. To accomplish these goals, systems and methods for control and calibration of VCSEL-diode-based optical transceivers according to embodiments of the invention are provided.

Accordingly, an object of the present invention is to provide an optical loop-back for sampling the laser output of the transceiver.

Another object of the invention is to provide an integrated A/D converter for dark, mark and space input readings.

Yet another object of the invention is to provide an integrated digitally programmable interface for programming laser bias and modulation currents.

Still another object of the invention is to provide a serial EEPROM interface for non-volatile target parameters and calibration data storage.

Still another object of the invention is to provide algorithmic control of the above-described features, to provide intelligent and automatic control and calibration of the primary optical link parameters.

The present invention is an optical transceiver system that includes circuitry including a light emitting device, a driver for the light emitting device being coupled to the light emitting device for providing activating power to said light emitting device and an optical detector disposed to receive light emitted from the light emitting device, said circuitry being substantially constructed using CMOS technology. A calibration interface is coupled to the circuitry for automatically executing an iterative cycle for a calibration of optical link parameters. And, an optical loop-back is included for optically coupling the light emitting device and the optical detector, the optical detector receiving light emitted by the light emitting device, the light emission being selectively stimulated by the calibration interface, the received light emission being communicated to the calibration interface for comparison with a known light signal. The present invention is further a method of automatic calibration and control of optical link parameters in a VCSEL-based optical transceiver.

DETAILED DESCRIPTION OF PREFERRED EMBODIMENTS

Figure 1:
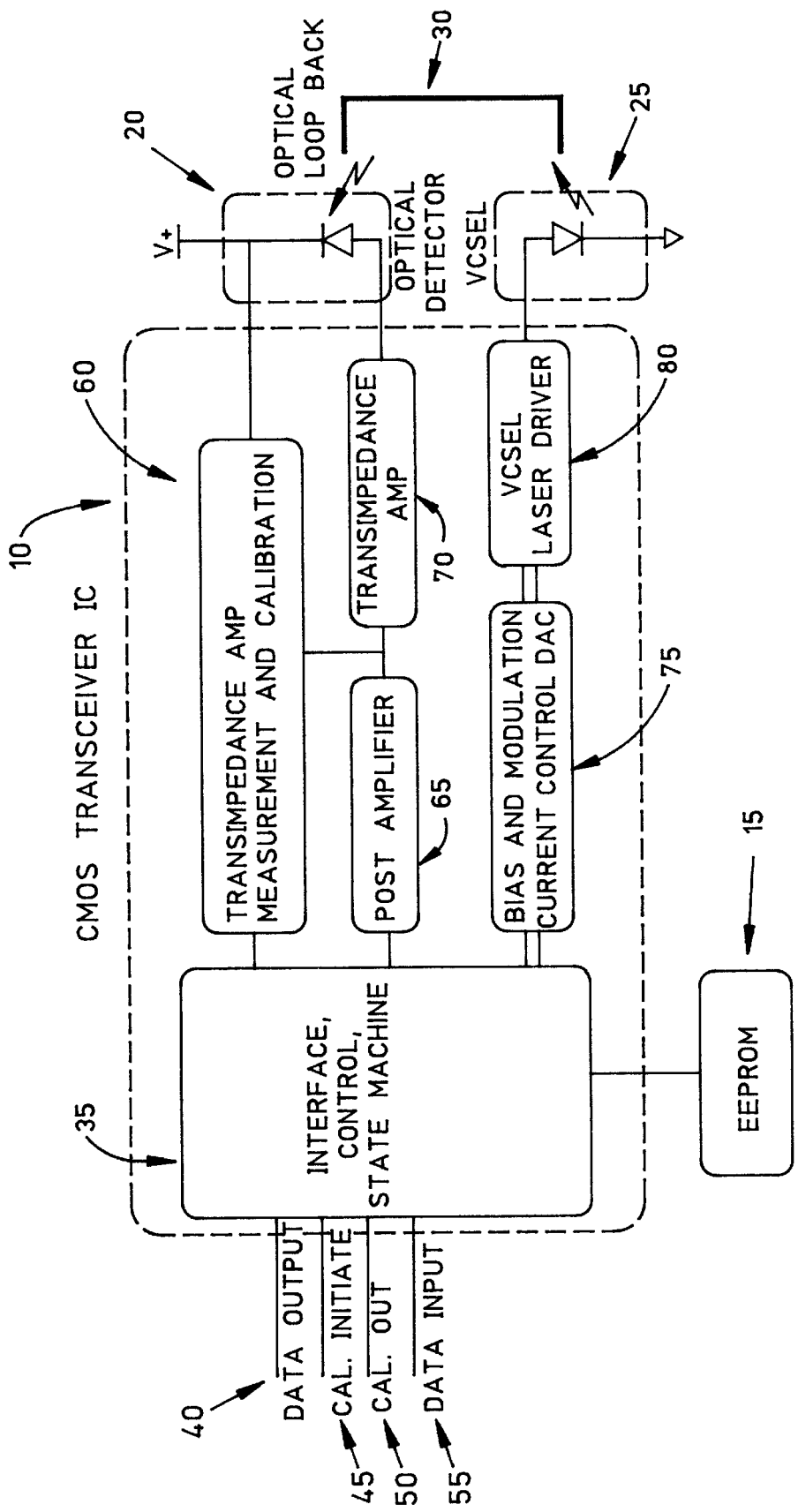
FIG. 1 is a block diagram showing a VCSEL-based optical transceiver according to an embodiment of the present invention.

FIG. 1 shows one preferred embodiment of a VCSEL-based optical transceiver that can be controlled and calibrated automatically. The system preferably comprises CMOS transceiver integrated circuit 10, electrically erasable programmable read only memory (EEPROM) 15, optical detector 20, VCSEL diode 25, and optical loop-back 30. CMOS transceiver integrated circuit 10 preferably includes block 35 comprising the interface, control and state machine.

Block 35 is connected to data output line 40, calibration initiate line 45, and calibration out line 50 and data input line 55. Circuit 10 also includes transimpedance amplifier measurement block 60, post amplifier 65, transimpedance amplifier 70, bias and modulation current control digital-to-analog converter 75 and VCSEL laser driver 80. Block 35 is connected to EEPROM 15, transimpedance amplifier measurement block 60, post amplifier 65, and bias and modulation current control digital-to-analog converter 75. Transimpedance amplifier measurement block 60 is directly connected to a first side of optical detector 20 for measuring light emission output of the VCSEL diode 25 sensed by optical detector 20. Block 60 is further connected to transimpedance amplifier 70 and post amplifier 65. Transimpedance amplifier 70 is connected to post amplifier 65 and further connected to optical detector 20. Bias modulation current control digital-to-analog converter block 75 is connected to VCSEL laser driver 80, which in turn is connected to VCSEL diode 25. Optical loop-back 30 extends between VCSEL diode 25 and optical detector 20. Optical loop-back 30 is an external component, preferably inserted into the duplex ports of transceiver integrated circuit 10 while the device is operating in calibration mode.

Figure 4:
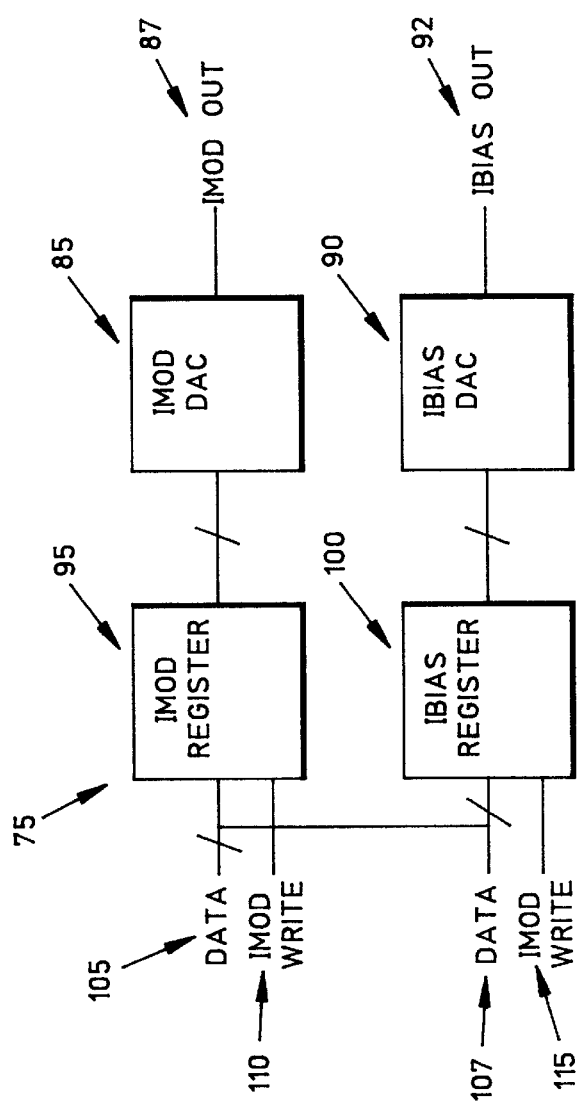
FIG. 4 is a more detailed block diagram of the bias and modulation current control digital to analog converter shown in FIG. 1.

FIG. 4 is a more detailed view of block 75 showing two digital to analog converters, Imod DAC 85 and Ibias DAC 90, each converter having output lines 87, 92, respectively. Block 75 is further comprised of Imod Register 95 and Ibias Register 100, each register having respective data lines 105, 107 and corresponding write lines, Imod write 110 and Ibias write 115. Step 120, then, initiates registers 95 and 100 to zero values.

Figure 5:
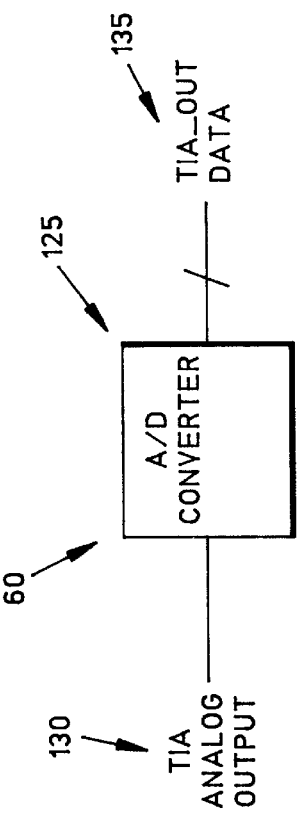
FIG. 5 is a more detailed block diagram of the transimpedance amp measurement block shown in FIG. 1.

A more detailed view of block 60 is shown in FIG. 5. As can be appreciated, block 60 contains analog to digital (A/D) converter 125, which is connected to Tia analog output line 130 and Tia_out data line 135. Based upon the signal received from optical detector 20 at Tia analog output 130, A/D converter 125 generates a new Tia out signal on line 135.

Full integration of VCSEL laser driver 80, transimpedance amplifier 70 and post amplifier 65, along with additional control measurement circuitry, as can be found in CMOS transceiver integrated circuit 10, allows circuit 10 to measure key laser optical parameters and to optimize bias (Ibias) and modulation (Imod) currents for driving VCSEL diode 25. Inserting optical loop-back 30 into the duplex ports permits the light output of VCSEL diode 25 to be received by optical detector 20.

In operation, calibration initiate input 45 into block 35 is toggled to initiate the calibration cycle. An on-chip ring oscillator (not shown) preferably is used to generate a local clock source for the calibration cycle. Serial data input 55 and output 40 are disabled during the calibration cycle, and calibration output 50 toggles high to indicate successful completion of the calibration cycle. Data input 55 and data output 40 give programmable access to EEPROM 15 so that optical link parameters may be stored and charged.

These high (Imod) and low (Ibias) reference values are set and stored on internal registers of the DAC 75. VCSEL laser driver 80 is then activated and the Tia output is digitized and compared to the stored reference level, while bias and modulation currents within laser driver 80 are stepped by control of the current setting digital-to-analog converter 75. The bias current setting controls the VCSEL diode 25 threshold current. The modulation current setting controls the maximum light output from VCSEL diode 25.

The setting of the bias and modulation currents optimizes the VCSEL diode 25 operation, compensating for variations in laser transfer characteristics (slope efficiency) and ensuring correct light level and extinction ratio (the ratio of data mark to data space levels). The bias and modulation current values are stored in EEPROM 15, ensuring non-volatile storage of the operating parameters after calibration.

Embodiments of the invention enable completely integrated measurement and control of the bias and modulation current requirements for VCSEL diode 25. Further, no complex packaging or calibration is required for monitoring the light output of VCSEL diode 25.

Figure 3:
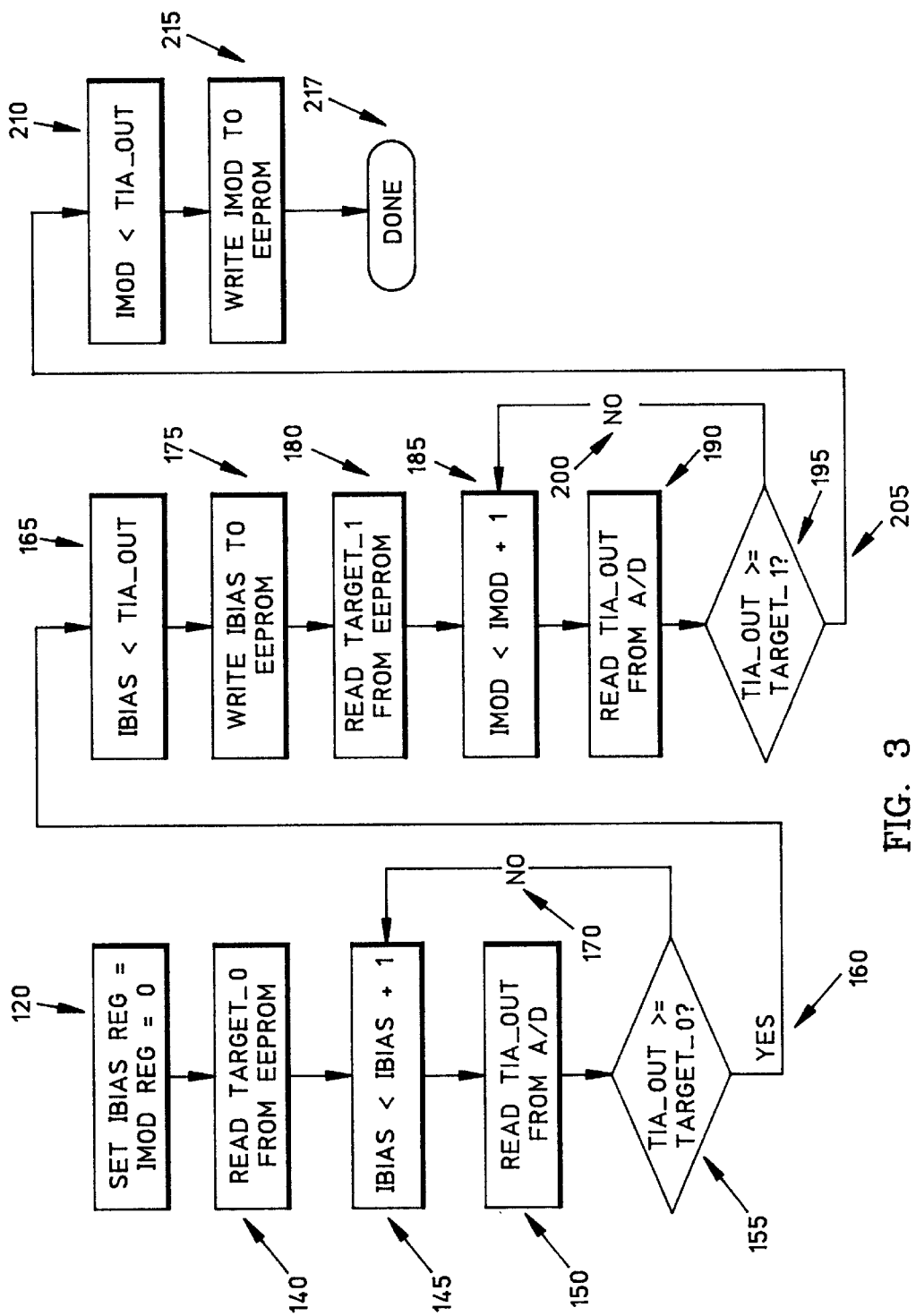
FIG. 3 is a flow chart showing the operation of an embodiment of the invention in calibration mode.

FIG. 3 is a flow chart of a calibration cycle according to an embodiment of the invention. The calibration cycle is initiated by transmitting the appropriate signal into calibration initiate 45 of block 35 (see FIG. 1).

First step 120 of the calibration cycle sets the values of Ibias and Imod to zero. These values are stored in Imod Register 95 (FIG. 4) and Ibias Register 100 located in the bias and modulation current control DAC 75 (FIG. 1).

The next sequential step, step 140, reads the target '0' information from EEPROM 15. The target '0' parameters are used to calibrate the laser to output a '0' bit. Advantageously, EEPROM 15 can be pre-programmed with information to accommodate a wide range of optical transmission parameters.

Step 145 then increments the Ibias value by a predetermined amount, writing the new value to Ibias register 100. A corresponding bias current is then generated by Ibias DAC 90 and is used by laser driver 80 to produce a light emission from diode 25. This light emission is then looped back through optical loop-back 30 to optical detector 20 and input into the transimpedance amplifier measurement and calibration block 60.

In step 150, the output generated by the A/D converter 125 (FIG. 5) is read. In step 155, the output from the A/D converter 125 is compared with the target '0' values previously retrieved from EEPROM 15. If the output from A/D converter 125 is greater than or equal to the target value, the calibration of the target '0' parameter is complete, 'yes' 160 is generated, and the cycle proceeds to step 165. Otherwise, 'no' 170 is generated and an iteration begins by jumping back to step 145. The Ibias value is again incremented, and the new Ibias value is again used by laser driver circuit 80 to produce a new light emission from VCSEL 25. Detector 20 receives the light emission and again supplies the A/D converter 125 with an analog signal which is converted to new digital signal Tia_out on line 135. This new value of Tia_out is read in step 150, and in step 155, is again compared to the target parameter. This iteration continues until the generated Tia_out signal on line 135 is greater than or equal to the target '0' parameter retrieved from EEPROM 15 in step 140. If this condition is satisfied, the 'yes' value 160 is generated.

After 'yes' 160 is generated, processing proceeds to step 165. There, the last value generated by A/D converter 125 is written to Ibias register 100. This value represents the calibrated value corresponding to the target '0' parameter. In the following step, step 175, the same Ibias value is stored in non-volatile EEPROM 15 for future use. Particularly, when the transceiver is turned off after calibration, the values written to the registers 95, 100 will be lost. When the unit is again powered up, the calibrated Ibias and Imod values are retrieved from EEPROM 15, or other comparable memory storage device.

At step 180, the calibrating of the target '1' parameter commences. As with the calibrating of the target '0' parameter, the target '1' parameter is first read from EEPROM 15. Step 185 increments the value of Imod by a predetermined amount from its initial zero value, as set in step 120. The current value is then used to generate a light emission from VCSEL 25 that is received by optical detector 20 through optical loop-back 30. A/D converter 125 generates a new value of Tia_out signal on line 135, which is read at step 190 and compared with the retrieved target parameter at step 195. If the newly generated value of the Tia_out signal is not greater than or equal to the target '1' parameter, 'no' 200 is generated and the cycle jumps back to step 185. There, Imod is again incremented and a new value of Tia_out signal on line 135 is generated as described above. This iteration continues until the Tia_out signal is greater than or equal to the target '1' parameter. At this point, 'yes' 205 is generated and the cycle proceeds to step 210.

At step 210, the value of Imod that meets the target parameter is stored in Imod register 95. As with the value of Ibias, the Imod value is also stored in EEPROM 15, at step 215, so that the Imod register can be restored to the correct value after the circuit has been powered down. The calibration cycle is then completed 217, as shown. A signal is generated on calibration output line 50 to indicate a successful calibration.

Figure 2:
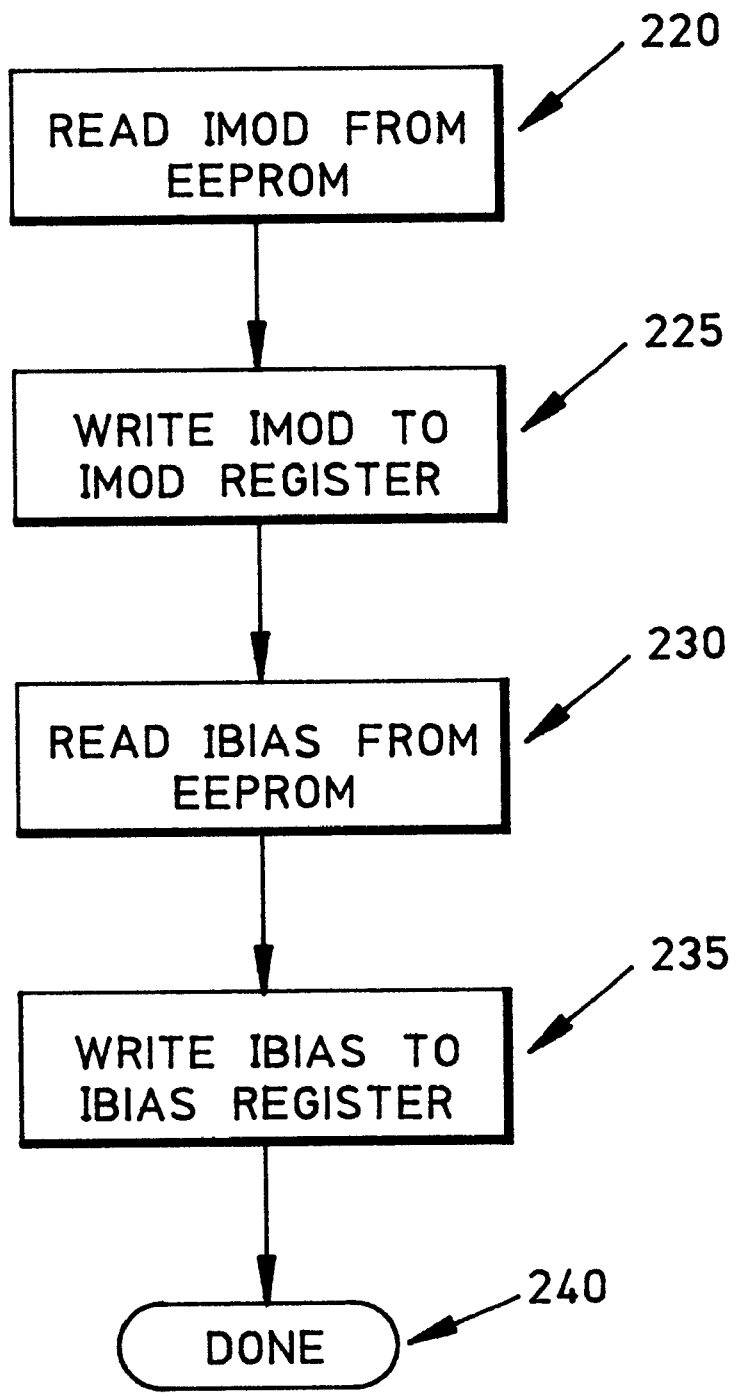
FIG. 2 is a flow chart showing the states of the operational mode of the optical transceiver.

FIG. 2 is a flow chart representing transceiver 10 running in its operational mode. When transceiver 10 is first powered up after calibration, the Ibias and Imod values stored in Ibias register 100 and Imod register 95 will no longer be present. The first step 220 in the operational mode is to read the Imod value from EEPROM 15. In step 225, the value is stored into Imod register 95 where it will be used by laser driver 80 to produce the calibrated logical '1' output light emission. The algorithm then proceeds to step 230, where the value stored for Ibias is retrieved from EEPROM 15 and written in step 235 to Ibias register 100 used by laser driver 80 to produce a logical '0' light emission from light emitting device 25. The algorithm is then completed 240, as shown.

It is anticipated that the cycles and algorithms described herein can be implemented in many ways. For example, the logic of the algorithm can be hard-wired into block 35. Further, block 35 can contain a microprocessor and minimal RAM and ROM that could store and execute programmed instructions in a manner consistent with the above described algorithm. It is anticipated that the invention can be implemented virtually completely using CMOS technology.

The specification is intended to be illustrative of the many variations and equivalents possible according to the invention. Various modifications in and changes to the above-described devices and methods will be apparent to those of ordinary skill. Though these systems and methods of control and calibration of an optical transceiver were described with particularity for uses directed at VCSEL diodes and high-speed fiber optic communications, other light emitting devices and other uses for such a system are contemplated. For example, LEDs may be used in some applications as a light source. Other applications that might benefit from this invention include bar code scanners, encoders, proximity sensors, laser printers, and laser range finders, among others.

What is claimed is:

1. A method of automatic calibration and control of optical link parameters in a VCSEL-based optical transceiver, the method comprising:

inserting an optical loop-back to optically couple an optical transmitter and an optical receiver;

initiating a calibration cycle by an input signal;

setting a first parameter to zero;

reading a target '0' value from a memory location;

generating a first light emission based upon the first parameter;

feeding the first light emission back to the optical detector through the optical loop-back;

comparing a value representing the first light emission to the target '0' value;

setting a second parameter to zero;

reading a target '1' value from a memory location;

generating a second light emission based upon the second parameter value;

feeding the second light emission back to the optical detector through the optical loop-back; and comparing a value representing the second light emission to the target '1' value.

2. The method of claim 1, further comprising:

determining whether the second light emission value is greater than or equal to the target '1' value; and incrementing a modulation current if the second light emission value is not greater than or equal to the target '1' value.

3. The method of claim 2, further comprising:

storing the second parameter, if the light emission value is greater than or equal to the target '1' value, in a memory location.

4. The method of claim 1, further comprising:

determining whether the first light emission value is greater than or equal to the target '0' value; and incrementing a bias current if the first light emission value is not greater than or equal to the target '0' value.

5. The method of claim 4, further comprising:

storing the first parameter, if the light emission value is greater than or equal to the target '0' value, in a memory location.

\* \* \* \* \*